(12) United States Patent
Mellert

(10) Patent No.: US 9,341,491 B2
(45) Date of Patent: May 17, 2016

(54) TECHNIQUE FOR DETERMINING POINTS OF INTEREST

(71) Applicant: Elektrobit Automotive GmbH, Erlangen (DE)

(72) Inventor: Christian Mellert, Walluf (DE)

(73) Assignee: Elektrobit Automotive GmbH, Erlangen (DE)

( * ) Notice: Subject to any disclaimer, the term of this patent is extended or adjusted under 35 U.S.C. 154(b) by 89 days.

(21) Appl. No.: 13/847,622

(22) Filed: Mar. 20, 2013

(65) Prior Publication Data

US 2013/0304372 A1    Nov. 14, 2013

(30) Foreign Application Priority Data

Mar. 20, 2012   (EP) .................................... 12001934

(51) Int. Cl.
| | |
|---|---|
| *G01C 21/34* | (2006.01) |
| *G01C 21/30* | (2006.01) |
| *G01C 21/36* | (2006.01) |

(52) U.S. Cl.
CPC ............ *G01C 21/3476* (2013.01); *G01C 21/30* (2013.01); *G01C 21/3679* (2013.01)

(58) Field of Classification Search
CPC ...................................................... G01C 21/30
USPC ................. 701/426, 438, 533, 408, 409, 410; 340/995.24, 995.27, 995.19
See application file for complete search history.

(56) References Cited

U.S. PATENT DOCUMENTS

| | | | | |
|---|---|---|---|---|
| 6,374,180 | B1 * | 4/2002 | Slominski .......... | G01C 21/3611 340/988 |
| 6,542,814 | B2 * | 4/2003 | Polidi ................ | G01C 21/3682 340/990 |
| 6,600,994 | B1 * | 7/2003 | Polidi ................ | G01C 21/3617 340/990 |
| 6,622,086 | B2 * | 9/2003 | Polidi .................. | G09B 29/106 340/995.19 |
| 6,775,613 | B2 * | 8/2004 | Burt .................... | G01C 21/3679 340/995.24 |
| 6,778,904 | B2 * | 8/2004 | Iwami ................ | G01C 21/3644 340/995.19 |
| 6,839,628 | B1 * | 1/2005 | Tu ...................... | G01C 21/3679 340/990 |

(Continued)

FOREIGN PATENT DOCUMENTS

EP         2 413 103 A2    2/2012

OTHER PUBLICATIONS

European Search Report issued in corresponding European patent application No. 12 001 934.4 dated Aug. 8, 2012.

*Primary Examiner* — Thomas G Black
*Assistant Examiner* — Wae Louie
(74) *Attorney, Agent, or Firm* — Carter, DeLuca, Farrell & Schmidt, LLP

(57) ABSTRACT

The disclosure relates to a technique for searching points of interest, or POIs, along a calculated route to be travelled. A method implementation thereof comprises the steps of providing an initial search corridor of predetermined size, wherein the corridor is indicative of a geographic area covering at least portions of the route to be travelled, performing a POI search within the provided search corridor, and adjusting the corridor size for a subsequent POI search based on a number of POI hits found during the POI search in the currently provided search corridor.

16 Claims, 6 Drawing Sheets

(56) References Cited

U.S. PATENT DOCUMENTS

| | | | | |
|---|---|---|---|---|
| 6,954,697 B1* | 10/2005 | Smith | G01C 21/30 340/990 |
| 7,054,743 B1* | 5/2006 | Smith | G01C 21/30 340/990 |
| 7,194,357 B2* | 3/2007 | Smith | G01C 21/30 340/990 |
| 7,324,896 B1* | 1/2008 | Smith | G01C 21/3679 340/990 |
| 7,565,239 B2* | 7/2009 | de Silva | G01C 21/3611 340/995.27 |
| 7,599,792 B1* | 10/2009 | Smith | G01C 21/3679 340/990 |
| 2002/0138196 A1* | 9/2002 | Polidi | G01C 21/3682 701/409 |
| 2003/0182057 A1* | 9/2003 | Burt | G01C 21/3679 701/408 |
| 2006/0074553 A1* | 4/2006 | Foo | G01C 21/367 701/431 |
| 2006/0212218 A1* | 9/2006 | Smith | G01C 21/30 701/426 |
| 2011/0251789 A1* | 10/2011 | Sanders | G06Q 10/08 701/533 |
| 2013/0218463 A1* | 8/2013 | Howard | G06F 17/30657 701/533 |
| 2013/0304372 A1* | 11/2013 | Mellert | G01C 21/3679 701/410 |

* cited by examiner

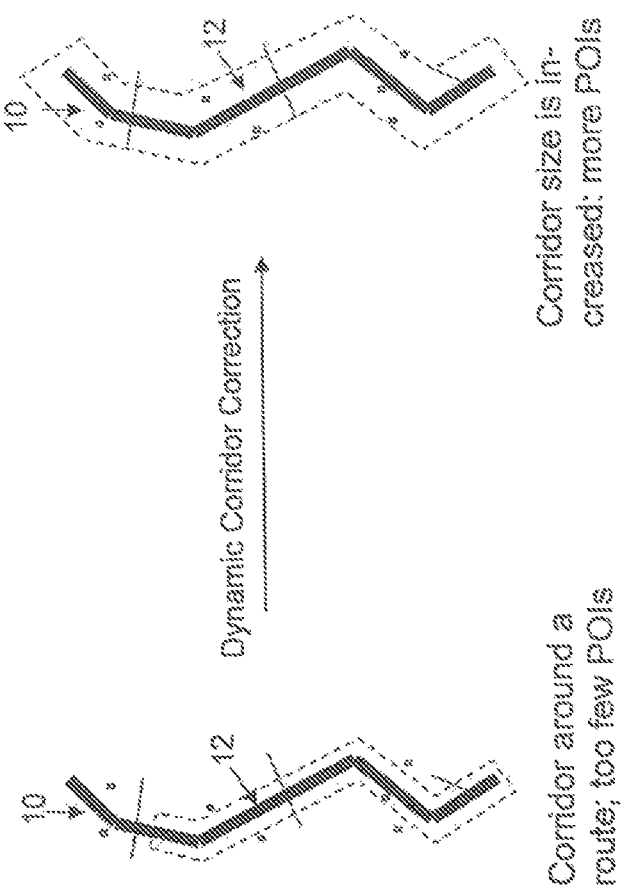

TECHNIQUE FOR DETERMINING POINTS OF INTEREST

TECHNICAL FIELD

The present disclosure relates to a technique for searching points of interests along a route to be travelled. This technique may be used in combination with navigation devices or route planners.

BACKGROUND

In connection with navigation or route planning, the term "points of interest", or POIs in short, refers to locations that are of particular interest due to their services, leisure offerings or tourist attractions. Examples for POIs are filling stations, pharmacies, cash dispensers, vehicle repair shops, accommodations, museums, cinemas or other tourist attractions. Modern navigation devices or route planners indicate POIs along a route to be travelled using different multimedia channels and multimedia formats. For instance, POIs may be output in form of visual symbols, sorted POI lists, voice output and so on.

Navigation devices may be configured to provide a continuous POI search along a route to be travelled. The POI search is in this case based on search areas or search corridors of predetermined sizes. One problem associated with the use of search areas of fixed size is that the number of found POIs may vary considerably from search to search depending on the POI distribution along the route. For instance, POI searches along routes going through urban areas may result in large numbers of found POIs, whereas POI searches performed along routes or route portions involving highways or interconnecting roads between towns or cities may only reveal a few POIs.

Further, POI searches in areas of high POI density require a lot of processing resources and may unnecessarily increase the search time. In order to save processing resources and in order to further increase the search performance, search algorithms may be provided with an exit condition so that the search can automatically be aborted. Such an exit condition may constitute the exceeding of a predetermined threshold value for the found number of POI hits. However, depending on the search algorithm, the set of POIs found before aborting the POI search may not be optimal with regard to distance to the route or distance to a user position. Thus, POI search results and POI search performance may strongly depend from route to route.

In addition, when a route is used for navigation, a POI search can be repeated regularly with different sets of results (due to POIs that have already been passed disappearing from the search result, or due to other POIs appearing in the search result that were previously not found because of an exit condition, or due to the route partially or completely changing because of traffic, user deviation from the original route or user input). Due to the local character of POI distributions, the aforementioned problems are likely to reoccur on subsequent repetitions of the search if performed from a position geographically close to the original search.

SUMMARY

It is an object to provide a method and a device for determining POIs, which method and device avoid at least one of the above mentioned or other disadvantages.

To achieve this object, a method of searching points of interests, or POIs, along a calculated route to be travelled is provided, wherein the method comprises the steps of: providing an initial search corridor of predetermined size, wherein the search corridor is indicative of a geographic area covering at least a portion of the route to be travelled; performing a POI search within the provided search corridor; and adjusting the corridor size for a subsequent POI search based on a number of POI hits found during the POI search in the currently provided search corridor.

The searching step as well as the adjusting step may be iteratively repeated until the (resulting) number of POI hits found within the iteratively adjusted corridor size meets a predetermined acceptance criterion. For this purpose, the current number of found POIs may be evaluated (or compared) against the acceptance criterion after each iteration (e.g., after each corridor size adjustment and after the subsequent POI search performed in the adjusted corridor size). The adjusting step may be stopped as soon as the acceptance criterion is met, whereas the POI searching step may continue (for instance, for the purpose of performing a continuous POI search or POI search update when travelling along the route). In this context, the searching step may continue on basis of the corridor size resulting from the last corridor adjustment iteration step or on basis of a default corridor size (that, for instance, may be used as starting corridor size for performing the above described POI search). In case the acceptance criterion may be met in consecutive searches associated with consecutive route positions while travelling along the route, no iterative adjustment may be performed, and the POI searching may be performed on basis of a corridor having a corridor size that corresponds to the size of the previously provided corridor. In case the acceptance criterion may not be met any longer while travelling along the route the iterative adjusting of the corridor size is re-started.

Possible acceptance criteria may be that the number of POI hits exceeds or falls below a predetermined value or lies within a predetermined hit range. The hit range may be defined by an upper and lower threshold value. The predetermined value, the upper and/or the lower threshold value may be individually pre-set by a user for each calculated route. In addition, or alternatively thereto, the predetermined value, the upper and/or the lower threshold value may each assume a pre-determined (i.e., device or searching algorithm dependent) default value.

The performed POI search (or POI search results) may be regularly updated. Regularly updating may include that the POI search is repeatedly performed within predetermined time intervals and/or route distances while travelling along the (calculated) route. The predetermined time and/or distance intervals may assume default values specified by the used search algorithm or values pre-set by the user. For each update event the POI searching step may be repeated at least once, wherein the POI searching step may be performed on updated search corridors related to the current route position of a user.

If POI search results are to be displayed to the user and updated regularly while the route is used for navigation, the searching step may continue to be iteratively repeated without the adjusting step as long as the acceptance criterion is met. Since during an ongoing navigation the route is continuously changing, the number of found POIs may be re-evaluated after each update against the acceptance criterion, and the same corridor size may be used for one or more (subsequent) POI search updates as long as the number of found POIs meets the acceptance criterion. Once the acceptance criterion may not be met any longer, the adjusting step may be performed again. For this purpose, according to one variant the adjusting step may be iteratively repeated by performing one adjusting step per update event. In other words, the corridor adjustment may be spread over multiple update intervals by only performing one searching step and one adjusting step per POI search update in order to improve search performance. According to an alternative variant, the POI searching step and corridor adjusting step may be repeated many times for each POI update event until the acceptance criterion for the found number of POI hits is met.

The method may further comprise (e.g., continuously) updating a route position and adjusting the provided search corridor to the updated route position. Adjusting the corridor to the route position may include that the search corridor is shifted along the route such that already travelled route portions may no longer be covered by the search corridor. In other words, the corridor may be shifted together with the detected moving position along the calculated route when travelling along the route. The corridor may be configured to always extend forward from the currently detected position in direction to the destination. The POI search or POI update may then be performed on basis of the shifted corridor (having the same or an adjusted corridor size and/or adjusted corridor shape with respect to a corridor underlying a previous POI search). For search performance reasons corridor portions of the shifted corridor overlapping with the previously provided corridor may be excluded from the new POI search.

The corridor size may be iteratively increased when the number of POI hits found during a POI search falls below a predetermined lower threshold. In such a case, the corridor size may be dynamically enlarged until the number of POI hits found in the enlarged corridor exceeds a lower threshold. The corridor size may be iteratively decreased when the number of POI hits within the corridor exceeds the upper threshold. In such a case, the corridor size may be dynamically decreased until the number of the found POI hits falls below a predetermined upper threshold. In this context, dynamically increasing/decreasing may mean that the corridor size is gradually increased or decreased (e.g., in discrete steps or continuously) during POI search.

The corridor size (and shape) may be adjusted by adjusting at least one of a corridor length and a corridor width. Corridor length and corridor width may be adjusted at the same rate keeping constant the aspect ratio between both dimensions. Alternatively, corridor length and corridor width may be adjusted at different rates. Whether the corridor length or corridor width or both is adjusted may depend on the details of the at least one route portion or route (e.g., on route parameters indicative of road categories, junction categories, etc.) the corridor is covering. For instance, in case the interesting route portion or route involves far distance roads and/or highways, it may be advantageous to provide a rectangular or tubular (i.e., potentially bent) corridor taking only POIs into account that are close to the route (e.g., located in the immediate vicinity along the route). In such a case, when starting from an initial corridor with predetermined size (e.g., predetermined aspect ratio between corridor length and corridor width) it may be advantageous to modify corridor length and corridor width at different rates. For instance, it may be advantageous to primarily modify the corridor length. Alternatively, close to highway exits or in urban areas it may be advantageous to adjust the corridor length and corridor width with the same rate in order to provide the user with POIs of shortest distance to the current user position.

Additionally, or alternatively thereto, the corridor size may be adjusted in dependence of one or more inputted POI search parameters, such as POI categories, shortest POI distance and so on. For instance, when searching for a filling station, it may be advantageous to find a filling station in service that is located closest to the current user position independent on the fact whether the station is located along the route or a bit away from the route so that the user has to leave the route for a moment.

The corridor size may be adjusted in a continuous way. "Continuous" may mean that the corridor length and/or corridor width may be continuously varied, for example, between a (predetermined) lower and upper limit. That means that the corridor width and corridor length may assume any value between the predetermined lower and upper limit. Alternatively thereto, the corridor width and corridor length may be adjusted in discrete steps. In such a case, a certain number of corridor configurations having predefined corridor sizes may be prestored in a database. The searching algorithm may start the POI search on basis of a corridor configuration having a median corridor size lying in-between the smallest and largest prestored corridor configurations. Depending on the number of found POI hits the search algorithm selects the next larger or smaller corridor from the pre-stored corridor set.

Additionally, or alternatively, to the corridor size adjustment the corridor shape may be adjusted during POI search. In general, the corridor shape may (roughly) follow the route shape. That is, the corridor may have a shape (comprising, e.g., multiple separate corridor portions) that substantially follows the route to be travelled. In this context, the corridor may assume a polygon shape, a tubular shape or a rectangular shape. The shape may be adjusted to the route configuration. For instance, at route intersections, highway exits/approaches the corridor may assume a circular shape, whereas for a longer route portions between exits the corridor may have a tubular shape.

The POI search within the corridor may further be performed in dependence of selected POI search parameters. The POI search parameters may be used by a search algorithm to filter certain POIs, POI categories, POI sub-categories, etc. from the whole stored POI set. The POI search parameters may be selectable by a user.

The method may further comprise the steps of sorting the POI hits found along the route in dependence of given sorting criteria, and outputting the sorted POI hits to the user. For this purpose, the search algorithm may be further provided with a sorting algorithm capable of sort found POI hits in dependence of given sorting criteria. Such a sorting criterion may be outputting found POIs in an increasing order beginning with the POI of shortest distance to a current user position. The sorting algorithm may also be capable of deleting POIs (for instance from a displayed POI list) when the user has passed POIs. Further, the output of the sorted POIs may be performed visually and/or acoustically.

The present disclosure further provides a computer programme product having programme code for performing the method when the computer programme product is executed on a computer means. For this purpose, the computer programme product can be stored on a computer readable recording medium.

Furthermore, the present disclosure provides a device for searching points of interest, or POIs, along a calculated route to be travelled, comprising a determining unit configured to provide a search corridor of predetermined size, wherein the search corridor is indicative of a geographic area covering at least a portion of the route to be travelled, a searching unit configured to perform a POI search within the provided search corridor, and an adjusting unit configured to adjust the corridor size for a subsequent POI search based on a number of POI hits found during the POI search in the currently provided search corridor.

The device may further comprise a position sensor configured to provide current position data of a user travelling along the route; a counting unit configured to count a number of found POIs within the search corridor and to compare the count number with one or more threshold values; and a database configured to store digital navigation data and POI data.

According to a further embodiment, the device may comprise a communication unit configured to establish at least one of wireless and wired communication for (e.g., navigation) data exchange. Via the communication unit, navigation data (such as map data, route data, name data, POI data etc.) can, for example, be regularly updated.

Also provided is a navigation device comprising the device configured as described herein.

BRIEF DESCRIPTION OF THE DRAWINGS

Further details, advantages and aspects of the present disclosure described herein will now be described with reference to the following drawings, wherein:

FIGS. 4A and 4B schematically illustrate a corridor adjustment embodiment according to the present disclosure;

DETAILED DESCRIPTION

In the following description, for purposes of explanation and not of limitation, specific details are set forth, such as a specific device configuration in order to provide a detailed understanding of the present disclosure. It will be apparent to one skilled in the art that the technique presented herein may be practiced in other embodiments departing from these specific details.

Those skilled in the art will further recognize that the methods, steps and functions explained herein may be implemented using individual hardware circuitry, using software functioning in conjunction with a programmed microprocessor or a general purpose computer using one or more application specific integrated circuits (ASICs), one or more digital signal processors (DSPs) and/or one or more field programmable gate arrays (FPGAs). It will also be recognized that the methods, steps and functions disclosed herein may be embodied in a processor and a memory coupled to the processor, wherein the memory stores one or more programs that control the processor to form the steps discussed herein when executed by the processor.

Figure 1:
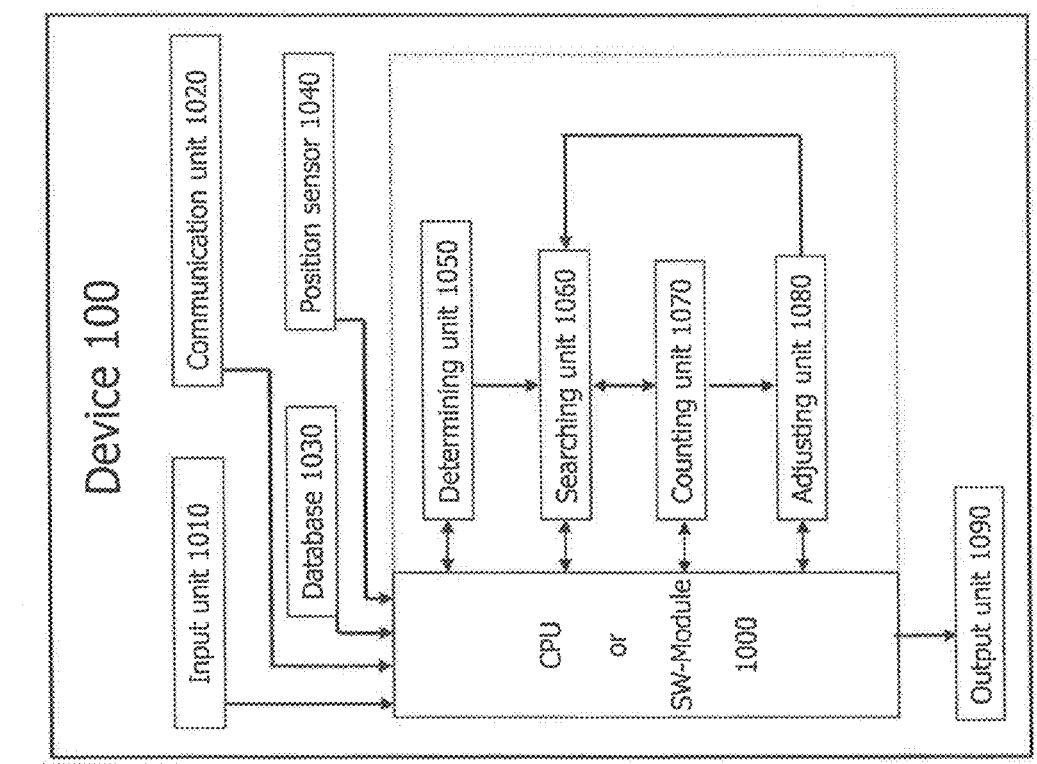
FIG. 1 illustrates a block diagram of a device according to an embodiment of the present disclosure.

FIG. 1 shows in form of a block diagram an embodiment of a device 100 configured to perform a POI search along a calculated route. The device 100 comprises a core functionality 1000 that may be implemented, for example, as a CPU (central processing unit) or as a software module (SW module). The device 100 further comprises at least one input unit 1010, a communication unit 1020, a database 1030, at least one position sensor 1040, a determining unit 1050, a searching unit 1060, a counting unit 1070 as well as an adjusting unit 1080. The device further comprises an output unit 1090.

The device 100 may be part of a navigation device integrated into a motor vehicle or realized as portable device (e.g., as a personal navigation device, PND). It is also conceivable that the device 100 or components thereof are implemented, for example, in a smart phone, a personal digital assistant (PDA) or in a computer with route planning capabilities.

The input unit 1010 is configured to act as interface between the device 100 and a user. It is configured to allow at least one of acoustic, haptic and optic inputs. For this purpose, the input unit 1010 may comprise at least one of input keys, a stylus, voice recognition means for recognizing speech inputs and means for detecting touch inputs on a touchscreen.

The communication module 1020 is configured to support at least one of wireless and wired communication with external devices, such as a navigation server, other navigation devices like user terminals (smartphones, PDA, etc.) and so on. The communication module may comprise at least one radio module (not shown in FIG. 1) for supporting, for example, at least one of LTE, UMTS and GPRS communication.

The database 1030 comprises navigation data in the form of map data, routing data, POI data, as well as other navigation data associated with enhanced navigation services. In this context, "enhanced navigation services" may comprise TMC services, digital terrain models, ortho-images, full text search, speech data, 3D data and so on. The navigation data are stored and organized within the database 1020 in form of data structures. The data structures may be relational data structures. The database 1020 may also comprise application programs and/or program routines configured to perform the method steps described below or as well other navigation services, such as route calculation.

The at least one position sensor 1040 is configured to provide position information of a user travelling along a calculated route. The at least one position sensor 1040 is configured to receive absolute position coordinates from a positioning system, such as the Global Positioning System (GPS), Galileo or other systems. Alternatively, or additionally, the at least one position sensor 1040 may further comprise relative navigation sensors, such as odometers and/or gyroscopes, in order to calculate the position of the device 100 in case no absolute position signal is available.

The output unit 1090 is configured to output at least one of calculated routes, map display data associated with calculated routes, POI information, TMC information and information associated with other enhanced navigation services. The output unit may comprise at least one of a display, touch-screen and acoustic output means in order to provide acoustic or optic outputs or combined optic and acoustic outputs.

Input unit 1010, communication unit 1020, database 1030, position sensor 1040 as well as output unit 1090 are communicatively connected to the core-functionality 1000. The core functionality 1000 manages the communication between the different units. Further, the determining unit 1050, the searching unit 1060, the counting 1070 as well as the adjusting unit 1080 are communicatively connected to the core functionality 1000. The units may be implemented as independent means or as part of the core functionality 1000 as indicated by the dotted line box in FIG. 1.

The determining unit 1050 is configured to determine a search corridor 12, 13, 14, 12', 13', 14' associated with a calculated route 10, 11 or portions thereof to be travelled (see FIGS. 4 to 6). The determining unit 1050 may also be configured to calculate a route 10, 11 based on stored route data as well as stored or input route parameters. Alternatively, the calculated route 10, 11 may be calculated separately in a different unit or received via the communication module 1020 from a navigation service node. In such a case, the route calculation may be calculated by a server unit and only the POI search on basis of a corridor configuration is performed by the device 100. The search corridor 12, 13, 14, 12', 13', 14' denotes a geographical area of certain shape and size surrounding the calculated route 10, 11 (or portions thereof). The search corridor 12, 13, 14, 12', 13', 14' provides a selected search area related to the route configuration.

The searching unit 1060 is configured to perform a POI search within the corridors 12, 13, 14, 12', 13', 14' provided by the determining unit 1050. The searching unit scans over the search corridor 12, 13, 14, 12', 13' 14' and selects all those POIs of the pre-stored POI set lying within the provided corridor 12, 13, 14, 12', 13', 14'. Further, by inputting POI search parameters the searching unit 1060 is configured to additionally filter those POIs within the search corridor 12, 13, 14, 12', 13', 14' which correspond to the search parameters.

The counting unit 1070 is configured to count POI hits during a POI search. During POI search, the POI hits are counted in real time. The counting unit 1070 is further configured to compare the number of POI hits with one or more predetermined threshold values (e.g., an upper and a lower threshold) and provides the comparing result to the adjusting unit 1090. Counting unit 1070 and searching unit 1060 may be implemented as a single unit.

The adjusting unit 1080 is configured to adjust at least one of the corridor size and corridor shape on basis of the counting result provided by the counting unit 1070. For this purpose, the adjusting unit 1080 is configured to increase or decrease the corridor size and/or to change the shape of the search corridor 12, 13, 14, 12', 13' 14'. The adjusting unit returns the adjusted corridor configuration (e.g., modified corridor size and/or corridor shape) to the searching unit 1060 for a subsequent POI search.

Figure 2:
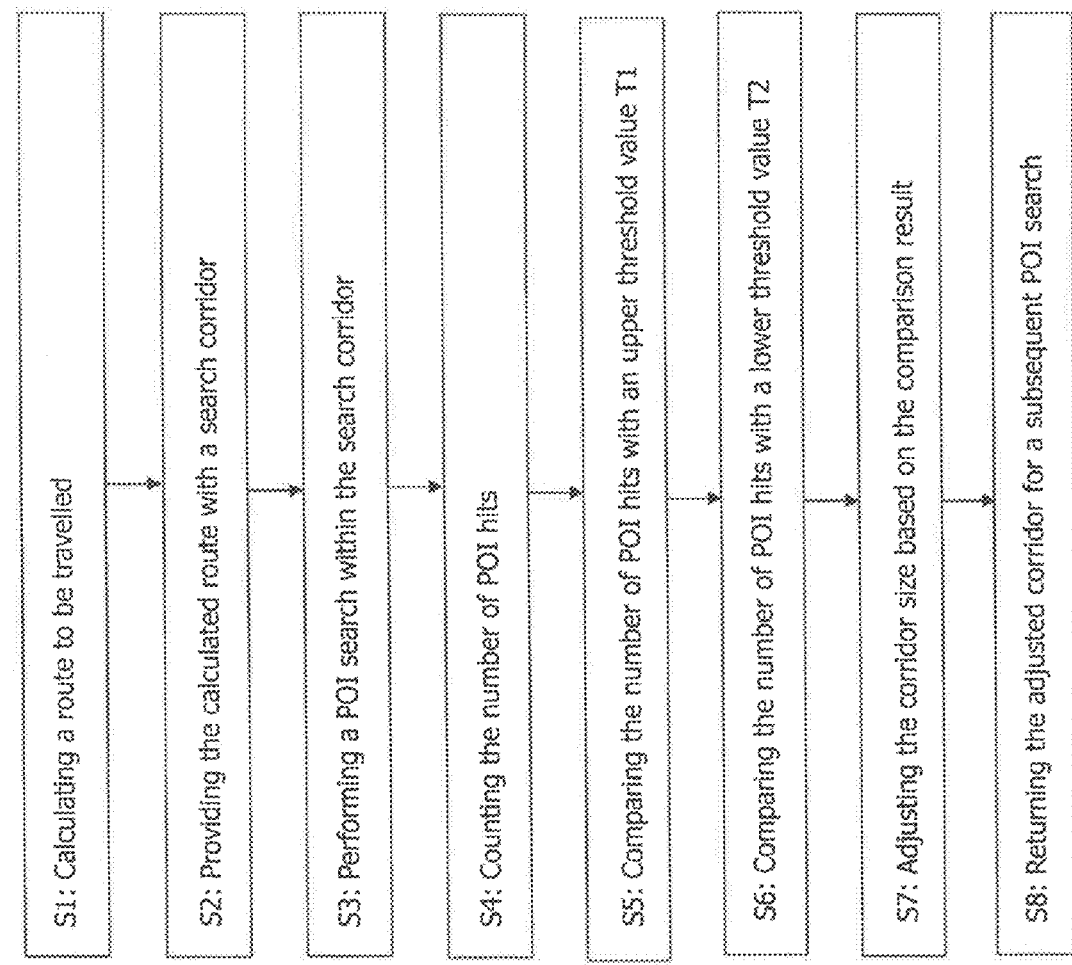
FIG. 2 illustrates a flow diagram of a method embodiment.

With reference to the flow diagram represented in FIG. 2 and the flow diagram represented in FIG. 3, method embodiments of the POI search in accordance with the present disclosure will now be explained in more detail. The method is explained using the components of device 100 represented in FIG. 1. It is evident that the method can also be executed by devices configured in another way.

In step S1, a desired route 10, 11 is calculated on basis of pre-stored route and/or map data and route parameters inputted by the user. Such route parameters may comprise a route starting point and a route end point. They may also comprise intermediate stops as well as information about road categories the routing algorithm should preferably use for route calculation. On basis of the route parameters and map data the determining unit 1050 calculates the route 10, 11. Alternatively, the route 10, 11 is calculated elsewhere and then forwarded to the determining unit 1050.

In subsequent step S2, the determining unit 1050 provides on basis of the calculated route and current position information (as derived from position sensor data provided by the at least one position sensor 1040) an initial search corridor 12, 13, 14 covering at least a portion of the calculated route 11, 12. The initial search corridor 12, 13, 14 may be determined on basis of route parameters and predetermined corridor parameters, such as corridor length, corridor width and/or corridor shape. In one embodiment, the initial corridor parameters are selectable by a user. In such a case, the parameters may be selectable for each route individually. In an alternative embodiment, the initial corridor configuration is given by a default configuration (which may be the same for each calculated route).

Alternatively, at least one set of search corridors having predetermined corridor configurations (i.e., predetermined corridor width, length and/or shape) is stored in the database 1030 and retrieved by the determining unit 1050. At the beginning of the POI search the determining unit 1050 may select an initial search corridor 12, 13, 14 with median corridor size from the pre-stored corridor set. The selection may depend on the route configuration. For instance, the corridor size and/or shape may depend on whether the route includes intersections, exits, approaches, highways and so on.

After determining the initial search corridor 12, 13, 14 a POI search is performed by the searching unit 1050 on basis of the determined corridor 12, 13, 14 in subsequent step S3. For this purpose, the searching unit 1060 scans the search corridor 12, 13, 14, 12', 13', 14' and is extracts all POIs out from the POI database that lie within the selected search corridor 12, 13, 14, 12', 13', 14'.

During POI search the number of POI hits is counted (step S4) by the counting unit 1070 and evaluated. In detail, the counting unit 1070 first compares the number of hits with an upper threshold T1 (step S5). This comparing may be performed continuously during POI search. It may be also performed after the corridor scan is terminated and a full number of POI hits for the search corridor 12, 13, 14, 12', 13', 14' have been found.

In case the number of POI hits exceeds the upper threshold value T1, the counting unit 1070 signals such an event to the adjusting unit 1080. Based on the received counting information, the adjusting unit 1080 adjust the provided corridor 12, 13, 14, 12', 13', 14' by decreasing its size (step S7). In case the found number of POI hits does not exceed the upper threshold T1 the counting unit 1070 checks whether the count number falls below a lower threshold T2 (step S6). In case, the counting unit 1070 evaluates that the found number falls below the lower threshold T2, the counting unit 1070 signals the adjusting unit 1080 to increase the corridor size. The adjusting unit 1080 then adjust the provided corridor 12, 13, 14, 12', 13', 14' by increasing its size.

After adjusting (i.e., increasing or decreasing) the corridor size, the adjusted corridor 12, 13, 14, 12', 13', 14' is returned back to the searching unit 1060 (step S8) in order to repeat the POI search on basis of the adjusted corridor configuration. The POI search and the corridor size adjustment are thereby iteratively repeated until the number of found POI hits lies within a predetermined hit range (given by the upper and lower thresholds T1, T2). Within a continuous POI search in which the POI search is continuously updated along the route (at predetermined intervals) the iteration is thereby spread over multiple intervals by performing only one searching step and one adjusting step per interval.

Figure 3:
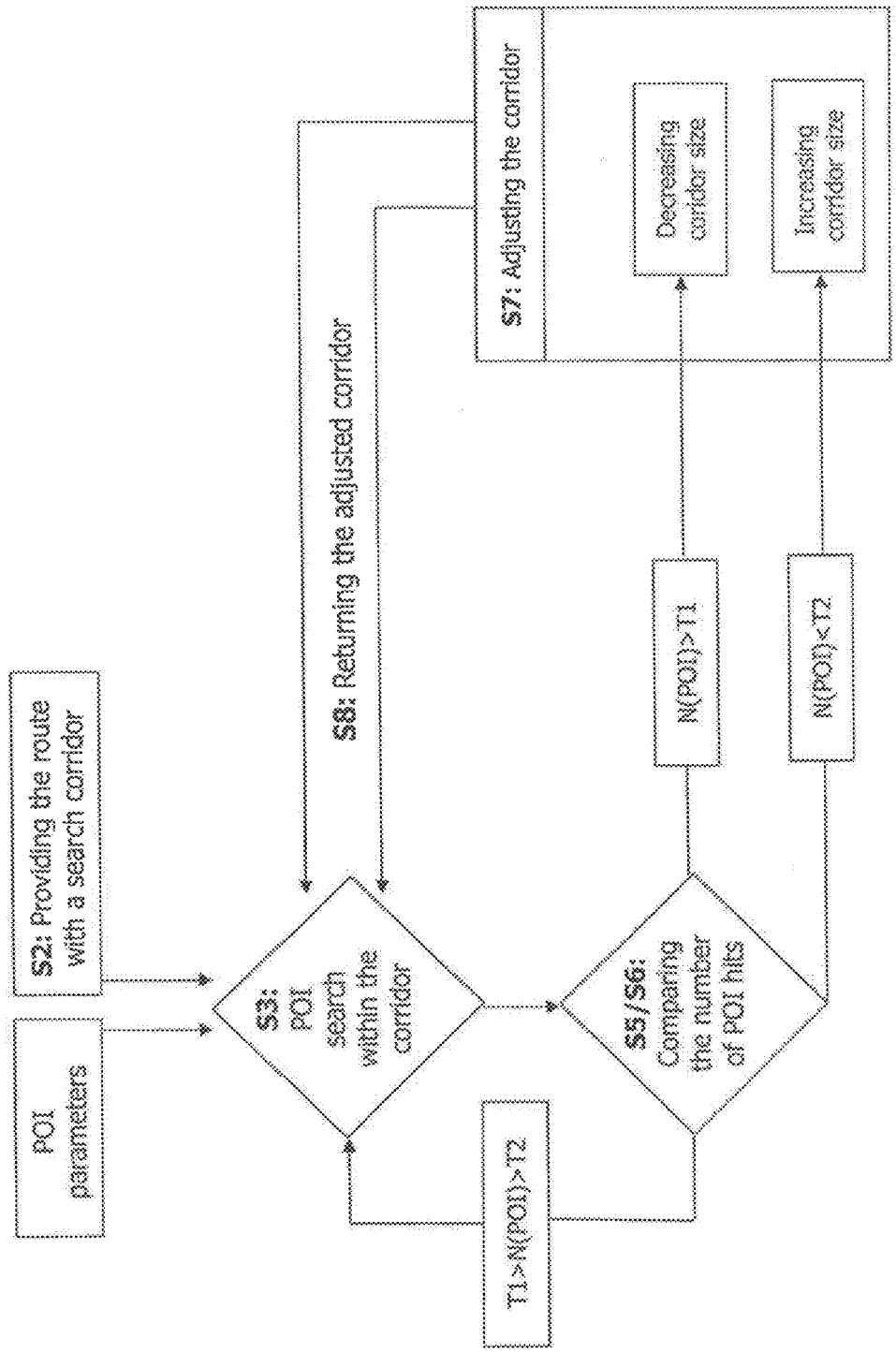
FIG. 3 illustrates a flow diagram of another method embodiment.

In case the counting result lies within the lower and upper threshold T1 and T2 (i.e., the number of found POIs lies within the desired hit range; left branch in FIG. 3) no corridor size adjustment is performed and a subsequent POI search is performed in a search corridor having the same corridor size (or corridor configuration) as the current or previous search corridor. In such a case, the counting unit 1070 directly signals the searching unit to use the same corridor size (configuration) for a subsequent POI search (when providing a continuous POI along the route, wherein the POI search is for example continuously updated).

The lower threshold T2 may assume a minimum hit value indicative of a minimum number of POI hits a navigation device should provide to the user. The upper threshold T1 may assume a value at least larger than the lower threshold T2 and smaller than a POI hit termination number used by the search algorithm for terminating a POI search. Upper and lower threshold values may be pre-set or selectable by the user. In an alternative embodiment it is also conceivable that only one threshold is used and that the POI search on adjusted corridors 12, 13, 14, 12', 13', 14' is repeated until the found POI number approximates the threshold value.

In the following exemplary adjustments of the corridor configurations are discussed in more detail with the embodiments shown in FIGS. 4 to 6.

FIGS. 4a/4b show a portion of a route (thick solid line) as well as corridor configurations (dashed line) around the route portion. Further, POIs along or in the vicinity of the route 10 are symbolized by open squares. In FIGS. 4a/4b a "tubular" corridor configuration is shown following the shape of the route portion. As it can be easily seen from FIG. 4a, only a few POIs are available within the given search corridor 12 and, therefore, only a small number of POI hits is expected to be found by the searching unit 1060. In order to find more POIs along the route 10, the adjusting unit 1080 dynamically increases the corridor size. Increasing the corridor size in this context means to increase the corridor width as well as the corridor length. As can be seen in FIG. 4b, substantially more POIs are covered by the increased corridor 12' including POIs along the route 10 as well as POIs lying further away from the route 10 to be travelled.

Figures 5A, 5B:
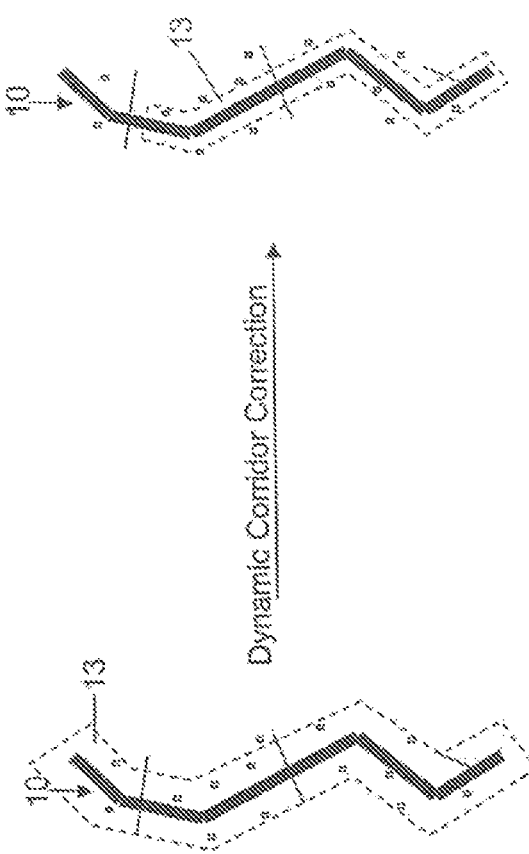
FIGS. 5A and 5B schematically illustrate a further corridor adjustment embodiment of the present disclosure.

The reverse case is shown in FIGS. 5a and 5b. In this case, the initial corridor 13 comprises a lot of POIs so that the adjusting unit 1080 dynamically corrects the corridor size by decreasing the corridor width and corridor length until the POI hit number assumes a desired value or lies within the predetermined hit range. While in FIG. 5a many POIs are found within the corresponding corridor 13, the number of POIs found in the adjusted corridor 13' in FIG. 5b is considerable decreased.

For both adjustments, i.e., for corridor size decreasing and corridor size increasing, the present technique may implement at least one of the following two approaches, namely a discrete and continuous adjustment approach. Continuous in this context means that corridor width and length can assume any value between a (predetermined or selectable) lower and upper limit so that the corridor size is continuously changed by the adjusting unit 1080. The advantage of such a continuous approach is that due to the continuous size adjustment the number of found POI hits can more easily be tuned to a desired number of results. On the other hand a continuous adjustment requires higher processing capabilities and therefore it request higher processing resources.

When using or implementing the discrete approach the corridor configuration is predefined and at least one set of corridors having different corridor configurations (e.g., different corridor sizes) are pre-stored. In such a case the determining unit 1050 selects an initial corridor from the at least one pre-stored corridor set having a medium size lying in between the shortest and narrowest corridor on the one hand and the longest and widest corridor on the other hand. Depending on the number of search results the adjusting unit 1080 may use the same corridor configuration for a next search, for instance, after a position update is carried out, or it selects a neighbouring corridor configurations, that is, a corridor having a lower corridor width and corridor length in case too many POIs are counted or a corridor having a higher corridor width and corridor length in case only a few POIs are initially found. The advantage of such a discrete approach is that less computing resources are required and a good search performance is still kept in urban areas as well as outside thereof. On the other hand the discrete approach will have a wider variance in POI result counts.

Figures 6A, 6B:
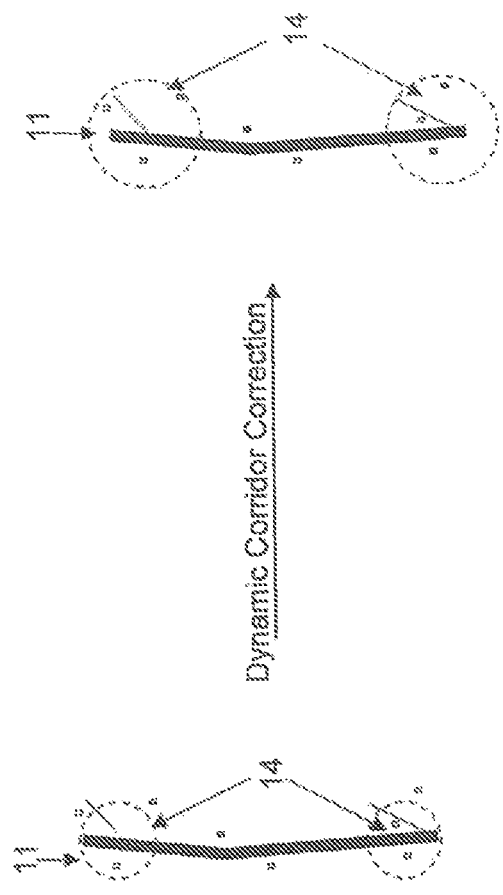
FIGS. 6A and 6B schematically illustrate a still further corridor embodiment of the present disclosure.

FIG. 6a and FIG. 6b show a further embodiment of a dynamic corridor adjustment. The corridor comprises two (or more, not shown) disconnected (or connected, not shown) corridor portions in the form of circular areas 14, 14'. In the exemplary case of circular areas as shown in FIGS. 6a and 6b, the corridor width is given by the radius of the circular area and the corridor length is given by the distance between both circles (between the center of the circles). Further, the circles are arranged to cover road exits (or intersections) so that only POIs in the vicinity of road exits are taken into account. POIs along the route 11 that lie between neighbouring exits remain unconsidered during POI search. Such a corridor configuration may be advantageous for routes involving far distance roads or highways, since POIs in the vicinity of the highway but far away from highway exits may be of little interest for a user.

As shown in FIGS. 6a and 6b, the dynamic corridor correction comprises adjusting both circular areas, wherein both circular areas are increased. It may be also conceivable that both circular areas are adjusted individually from each other (for instance, by adjusting only one circle while keeping the other constant, or by increasing one circle while decreasing the other one). In this context, it is also clear that the present embodiment is not limited to two circular (or non-circular, not shown) areas. It is also conceivable that the corridor configuration may comprise disconnected search areas with any geometrical shape covering more than two consecutive exits.

In sum, the technique described herein provides the user with only those POIs, which are closely associated with a selected route and which are easily accessible by the user. Thus the described technique considerably improves the POI search along routes by simultaneously keeping high the search performance.

While the current invention has been described in relation to its preferred embodiments, it is to be understood that this disclosure is for illustrative purposes only. Accordingly, it is intended that the invention be limited only by the scope of the claims appended hereto.

The invention claimed is:

1. A method of searching points of interest, or POIs, along a calculated route to be travelled, comprising:
   providing an initial search corridor of predetermined size, wherein the search corridor is indicative of a geographic area covering at least a portion of the route to be travelled;
   performing a POI search within the provided search corridor; and
   adjusting the corridor size for a subsequent POI search based on a number of POI hits found during the POI search in the currently provided search corridor,
   wherein the adjusting step and the performing the POI search step are iteratively repeated until the number of POI hits found within the iteratively adjusted corridor size meets an acceptance criterion, and
   wherein the adjusting step is stopped as soon as the acceptance criterion is met, whereas the performing the POI search step continues on a basis of the adjusted corridor size while traveling along the route.

2. The method according to claim 1, further comprising regularly updating the POI search, wherein for each POI update the performing the POI search step is repeated at least once.

3. The method according to claim 2, wherein the adjusting step is iteratively repeated by performing one adjusting step per POI update event.

4. The method according to claim 1, further comprising updating a route position, and adjusting the search corridor to the updated route position.

5. The method according to claim 1, wherein the adjusting step comprises iteratively increasing the corridor size when a number of found POI hits falls below a predetermined lower threshold.

6. The method according to claim 1, wherein the adjusting step comprises iteratively decreasing the corridor size when a number of found POI hits exceeds a predetermined upper threshold.

7. The method according to claim 1, wherein adjusting the corridor size comprises adjusting at least one of a corridor length and a corridor width.

8. The method according to claim 1, wherein the corridor size is adjusted in a continuous manner.

9. The method according to claim 1, wherein the corridor size is adjusted in discrete steps using pre-stored corridor configurations associated with predetermined corridor sizes.

10. The method according to claim 1, further comprising adjusting a shape of the search corridor for a subsequent POI search.

11. The method according to claim 1, wherein the POI search within the search corridor is performed in dependence of selected POI parameters.

12. The method according to claim 1, wherein the search corridor has a shape that substantially follows the route or the route portion to be travelled.

13. A non-transitory computer-readable recording medium storing a computer program product having program code for performing the method according to claim 1.

14. A device for searching points of interests, or POIs, along a calculated route to be travelled, comprising:
- a determining unit configured to provide a search corridor of predetermined size, wherein the search corridor is indicative of a geographic area covering at least a portion of the route to be travelled;
- a searching unit configured to perform a POI search within the provided search corridor; and
- an adjusting unit configured to adjust the corridor size for a subsequent POI search based on a number of POI hits found during the POI search in the currently provided search corridor,
- wherein the adjusting and the performing the POI search are iteratively repeated until the number of the POI hits found within the iteratively adjusted corridor size meets an acceptance criterion, and
- wherein the adjusting is stopped as soon as the acceptance criterion is met, whereas the performing the POI search continues on a basis of the adjusted corridor size while traveling along the route.

15. The device according to claim 14, further comprising:
- a position sensor, configured to provide current position data of a user travelling along the route;
- a counting unit configured to count a number of found POIs within the corridor and to compare the count number with at least one threshold; and
- a database configured to store digital navigation data.

16. A navigation device comprising the device of claim 14.

* * * * *